United States Patent [19]

Jones

[11] Patent Number: 5,033,029

[45] Date of Patent: Jul. 16, 1991

[54] INTERLACED SONAR SYSTEM

[75] Inventor: Charles H. Jones, Pasadena, Md.

[73] Assignee: Westinghouse Electric Corp., Pittsburgh, Pa.

[21] Appl. No.: 494,131

[22] Filed: May 12, 1983

[51] Int. Cl.$^5$ .............................................. G01S 15/89
[52] U.S. Cl. ........................................ 367/88; 367/104
[58] Field of Search .................................. 367/88, 104

[56] References Cited

U.S. PATENT DOCUMENTS

| | | | |
|---|---|---|---|
| 3,144,631 | 8/1964 | Lustig et al. | 367/88 |
| 3,304,532 | 2/1967 | Nelkin et al. | 367/88 |
| 3,585,578 | 6/1971 | Fischer, Jr. | 367/88 |
| 3,603,992 | 9/1971 | Goggins, Jr. et al. | 342/25 |
| 3,742,436 | 6/1973 | Jones | 367/88 X |
| 3,768,096 | 10/1973 | Dentino | 342/25 |
| 3,848,253 | 11/1974 | Genvist et al. | 342/149 |
| 3,927,405 | 12/1975 | Poinsard et al. | 342/194 |
| 3,950,723 | 4/1976 | Gilmour | 367/88 X |
| 3,975,704 | 8/1976 | Klein | 367/88 |
| 3,987,444 | 8/1976 | Hitchcock | 342/380 |
| 4,045,795 | 8/1977 | Fletcher et al. | 342/22 |
| 4,060,791 | 11/1977 | Jones et al. | 367/104 X |
| 4,063,212 | 12/1977 | Sublett | 367/88 |
| 4,064,510 | 12/1977 | Chabah | 342/25 |
| 4,150,376 | 4/1979 | Blythe et al. | 342/25 |
| 4,183,024 | 1/1980 | Brooks | 342/194 |
| 4,216,537 | 8/1980 | Delignieres | 367/88 |

Primary Examiner—Daniel T. Pihulic
Attorney, Agent, or Firm—D. Schron

[57] ABSTRACT

A sonar system which insonifies a target area in a plurality of distinct and separated insonified regions as a result of an acoustic transmission and thereafter fills in the blank regions upon subsequent transmissions, with each transmission always leaving a space between insonified regions, which is filled in by a subsequent transmission or transmissions.

13 Claims, 13 Drawing Sheets

INTERLACED SONAR SYSTEM

BACKGROUND OF THE INVENTION

1. Field of the Invention

The invention in general relates to sonar systems, and more particularly, to a multibeam sonar system for imaging a target area.

2. Description of the Prior Art

Various sonar systems have been developed for obtaining an acoustic representation of a target area. For example, in a side looking sonar system, transducer equipment on board a carrier vehicle is operable to project acoustic energy toward the target area so as to impinge upon an extremely narrow region in the form of an elongated strip generally perpendicular to the direction of travel of the carrier vehicle and commonly referred to as an insonified region or strip. The reflected energy is received from the strip and with multiple transmissions and receptions, an acoustic representation of the target area may be displayed.

Since the strip is relatively narrow in the direction of travel, many systems employ multiple beam formation so that a plurality of adjacent strips may be imaged with a single acoustic transmission, thereby allowing for a greater carrier speed and an increase in the mapping rate.

Multibeam side look sonars, however, sometimes provide poorer images than a single beam system having the same frequency, range and resolution. It is believed that the degradation is due to acoustic energy from one strip scattering into the next adjacent strips of the multibeam system.

SUMMARY OF THE INVENTION

The present invention substantially reduces or eliminates the problem of degraded resolution in multibeam sonar systems used to image a target area. A transmitter means including transmitter transducer means is operable to repetitively transmit acoustic pulses toward the target area and is operable to insonify on one acoustic transmission a plurality of similar but separated regions of the target area. Receiver means including receiver transducer means is operable to receive the acoustic returns from the separated insonified regions and the returns are processed and stored. The transmitter means is operable on each subsequent acoustic transmission to again insonify a plurality of similar but separated regions with at least one of the regions lying in the space between two regions which have been insonified on a previous transmission. The processed and stored acoustic returns may, if desired, be presented on an appropriate display.

DESCRIPTION OF THE PREFERRED EMBODIMENTS

Figure 1:
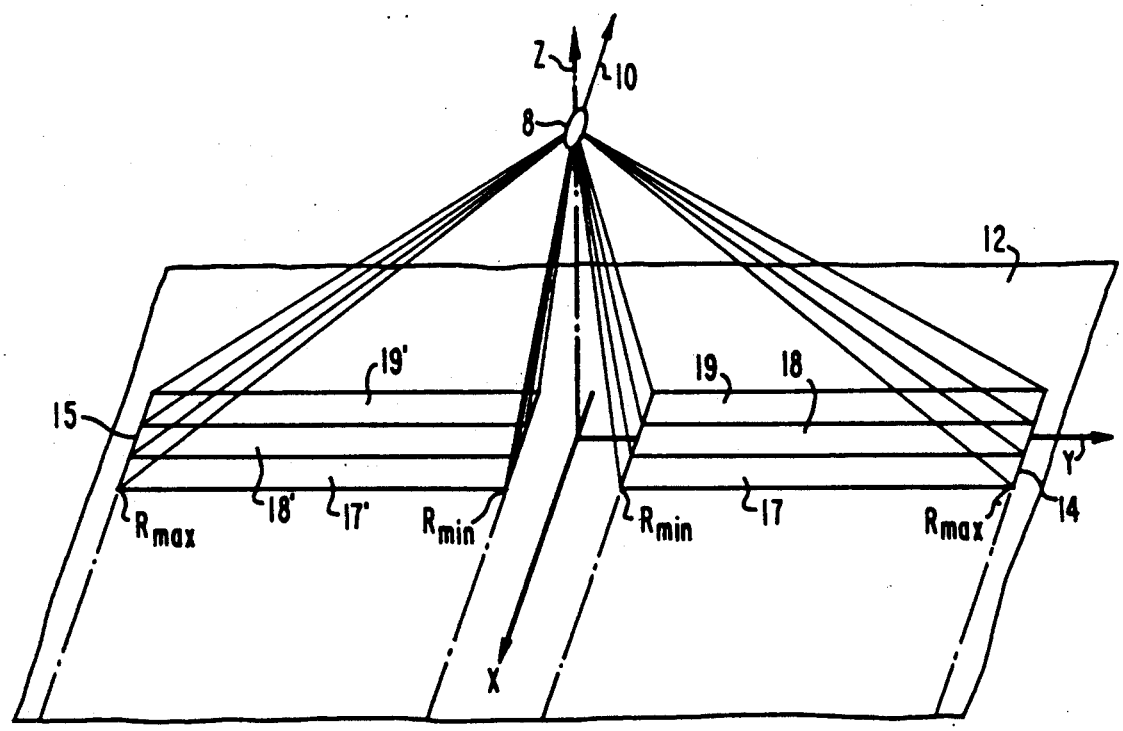
FIG. 1 illustrates a side looking sonar system of the prior art, in operation over a target area.

Referring now to FIG. 1, which basically illustrates the principles of a multibeam side looking sonar system, an underwater carrier vehicle 8 moves in the direction of arrow 10 at a certain altitude above a target area such as the sea bottom 12. Side looking sonar apparatus on the carrier vehicle is operative to repetitively transmit acoustic pulses athwartship of the carrier to impinge upon the sea bottom to sweep out respective starboard and port insonified regions 14 and 15 from some minimum range $R_{min}$ to some maximum range $R_{max}$.

The apparatus forms multiple receiver beams for examining a plurality of adjacent insonified strips, three of which, 17, 18 and 19 (and their primed counterparts), are illustrated. The acoustic returns from the individual insonified strips on either side of the carrier vehicle are processed, stored and displayed to build up a representative picture of the target area over which the carrier vehicle operates. Since the strips 17, 18 and 19 are very close to one another and generally touch, there may be a scattering of acoustic energy from adjacent strips to objects on the desired strip. To the onboard apparatus, this energy degrades the signal emanating from the desired strip, thereby presenting inaccurate information. This problem is substantially eliminated with the present invention and to this end reference is made to FIG. 2 illustrating one embodiment of the invention.

Figure 2:
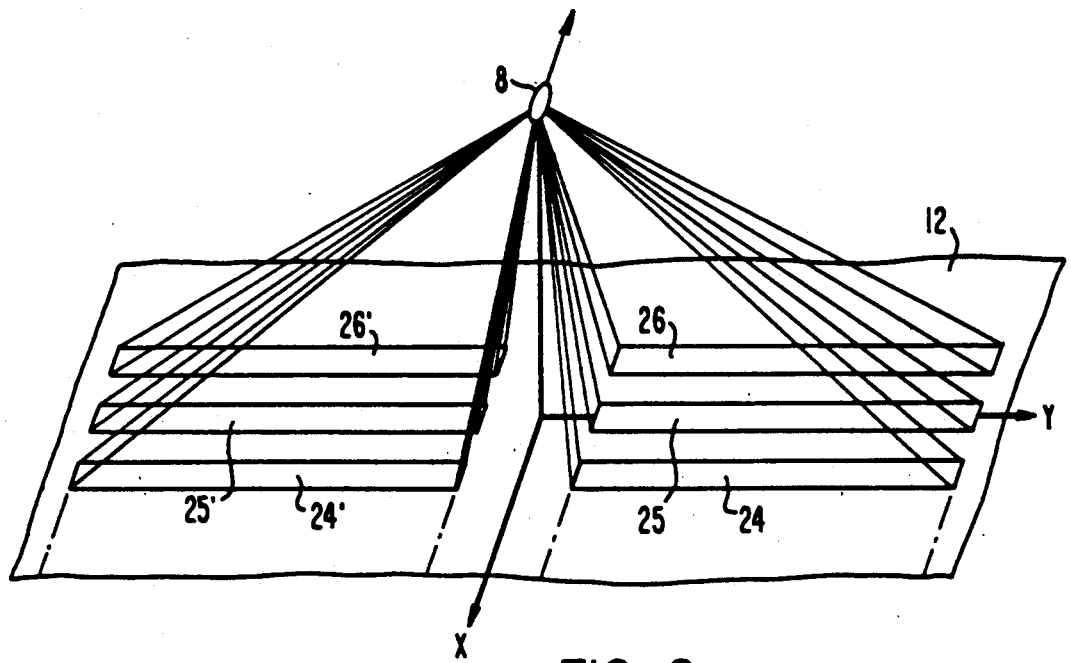
FIG. 2 illustrates a side looking sonar system in accordance with one embodiment of the present invention, in operation over a target area.

In FIG. 2 the side looking sonar apparatus on board carrier 8 is operable to insonify a plurality of strips 24, 25 and 26 (and their primed counterparts on the port side), with the insonified strips being separated from one another, as opposed to touching one another as illustrated in FIG. 1.

FIGS. 3A through 3E illustrate a variety of beam geometries that are practical.

The inventor has found that with fan beam sonars, having a specified number of beams, only certain beam separations can be used in order to achieve uniform coverage of an area with no gaps or overlap except at the beginning and end of each run. Let W = the width of the strip associated with a single beam;

S = the separation between the centerlines of adjacent beams;

B = the number of simultaneous beams. In a sidelook system it is the number of beams on each side of the vehicle.

For a suitable interlace to be obtained (S/W) must be a whole number and B and (S/W) must contain no common prime factor. For example consider: B=9 and (S/W)=6.

The factors of 9 are 3 and 3. The factors of 6 are 2 and 3. Since B and (S/W) both contain the common factor 3 such a combination will not achieve a satisfactory interlace. The X marks in Table I below show some of the combinations of B and (S/W) that are not practical. The squares that do not contain an X are combinations that produce satisfactory interlaces. Uniform coverage is achieved with no area covered more than once and no are missed except att he very beginning and the end of any run.

TABLE I

Allowable values for the number of beams B as a function of the ratio of beam separation to beam width (S/W)

| | | S/W = (beam separation)/(beam width) | | | | | | | | | | |
|---|---|---|---|---|---|---|---|---|---|---|---|---|
| | | 2 | 3 | 4 | 5 | 6 | 7 | 8 | 9 | 10 | 11 | 12 | 13 |
| B = the number of simultaneous beams | 2 | X | | X | | X | | X | | X | | X | |
| | 3 | | X | | | X | | | X | | | X | |
| | 4 | X | | X | | X | | X | | X | | X | |
| | 5 | | | | X | | | | | X | | | |
| | 6 | X | X | X | | X | | X | X | X | | X | |
| | 7 | | | | | | X | | | | | | |
| | 8 | X | | X | | X | | X | | X | | X | |
| | 9 | | X | | | X | | | X | | | X | |
| | 10 | X | | X | X | X | | X | | X | | X | |
| | 11 | | | | | | | | | | X | | |
| | 12 | X | X | X | | X | | X | X | X | | X | |
| | 13 | | | | | | | | | | | | X |

B and (S/W) must not have a common prime factor.

With no interlace the vehicle speed is proportional to the number of beams (or pairs of beams). When interlace is used the vehicle speed and coverage rates will also be proportional to the number of beams. The vehicle should move a distance B×W between successive pulses. The manner by which the target area may be imaged is further illustrated in FIG. 3A. T1 represents a first transmission as the carrier moves along the X direction as indicated by arrow 10. The first transmission and subsequent reception results in information being obtained from a first plurality of insonified strips designated T1-1, T1-2 and T1-3 indicating the first, second and third strips resulting from transmission T1. A subsequent transmission T2 takes place after the carrier has moved a distance of 3W in the X direction. As a result of the transmission T2, information is next obtained from the plurality of insonified strips T2-1, T2-2 and T2-3. For convenience, only the starboard insonified regions are illustrated, it being understood that an identical process would take place on the port side.

Figure 3A:
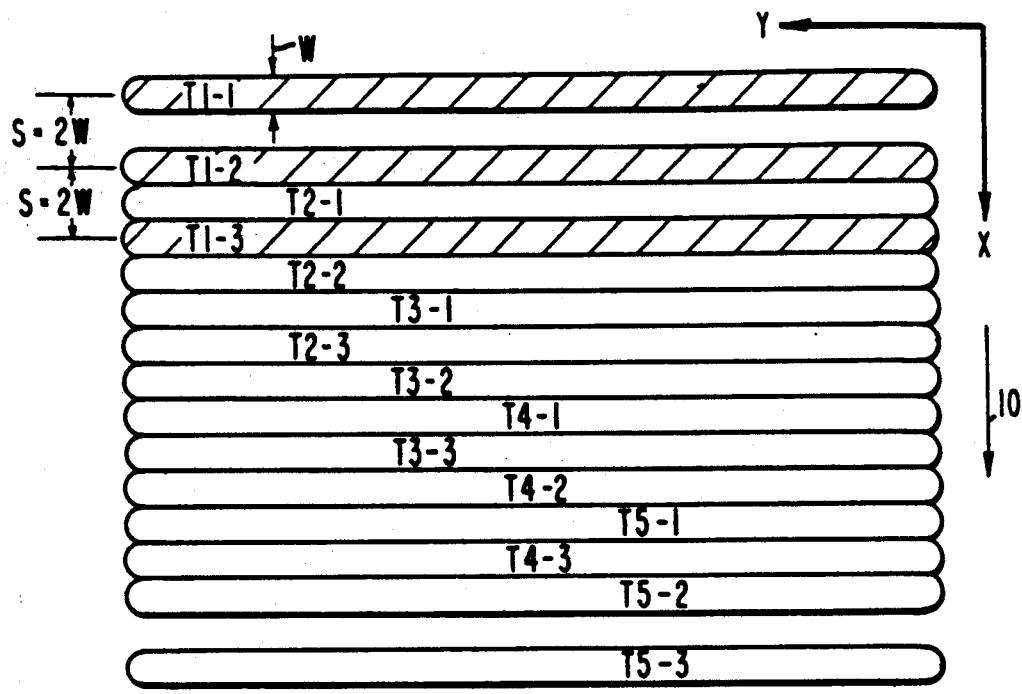
FIG. 3A, 3B, 3C, 3D and 3E are four examples that illustrate the insonification of parallel strips of target area with repetitive acoustic transmissions.
Figure 3B:
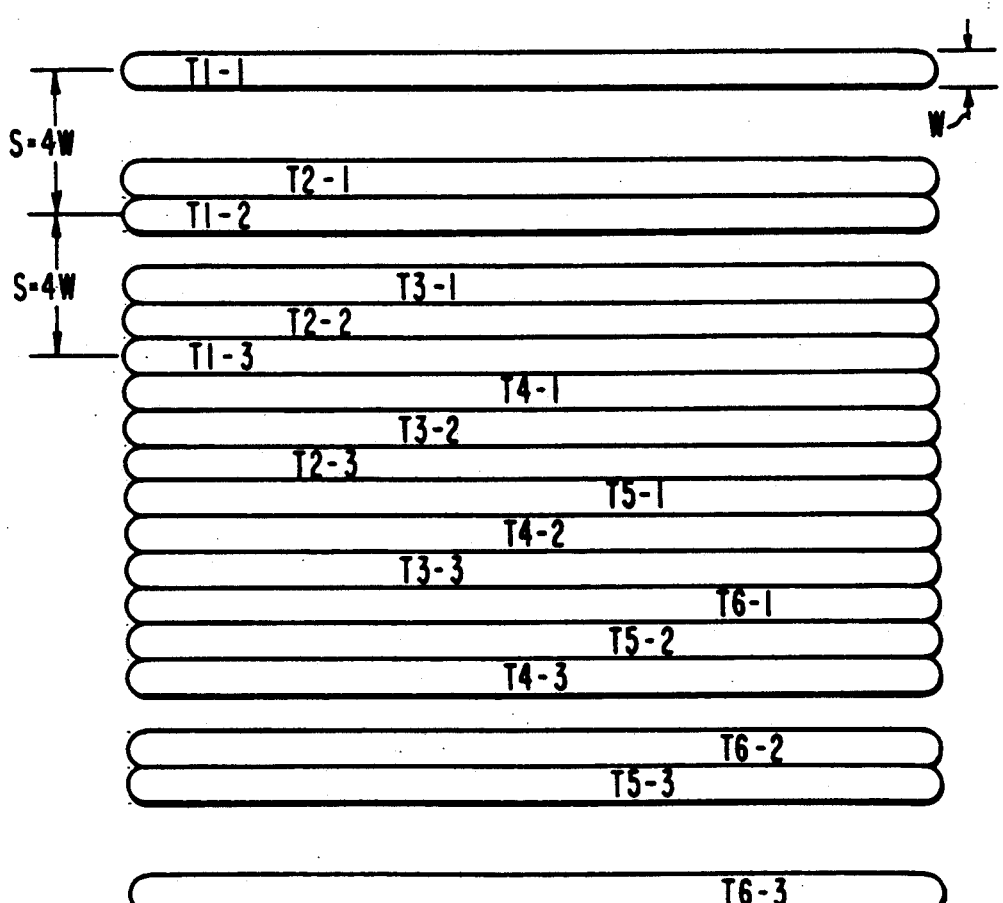

After, transmission T2 and after the vehicle has traveled another distance of 3W, a third transmission T3 takes place for generating insonified strips T3-1, T3-2 and T3-3. The process is continued such that as a result of each transmission a plurality of separated strips are generated, at least one of which falls between two insonified strips of a previous transmission. It can be seen therefore that information from only two regions (between the first two and between the last two strips) will be missing, representing an insignificant portion of a typical run. FIG. 3B illustrates a set of three simultaneous beams that are separated a distance of 4W. The set of beams move forward a distance of 3W between pings. Again, all of the swath area is covered once and only once except at the very beginning and end of the run. The areas labeled T1-1, T1-2, and T1-3 show the positions of the three sonified areas associated with the first transmitted signal.

T2-1, T2-2, and T2-3 are the areas associated with the second transmitted signal after the vehicle has moved forward a distance 3W. The third set of three areas are labeled T3, the fourth T4, the fifth T5, and the last set shown is T6.

Figure 3C:
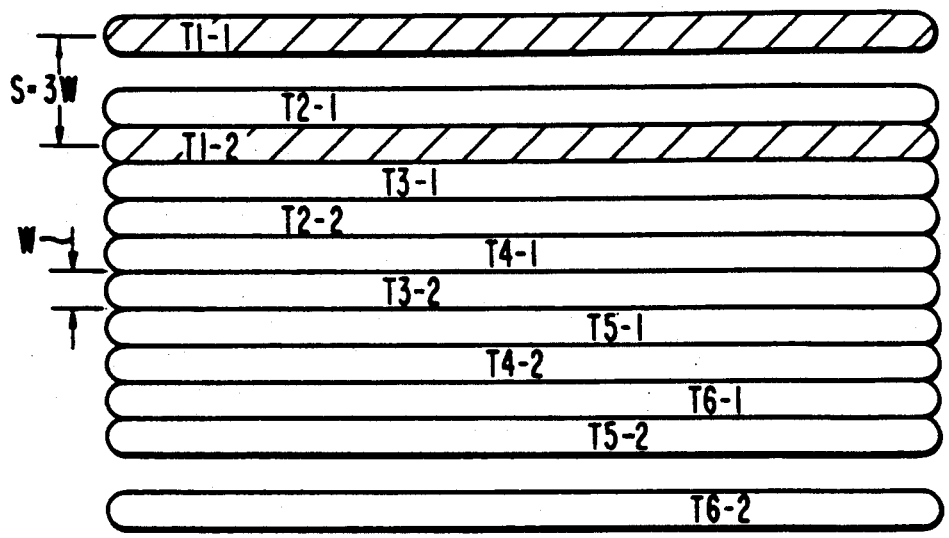
Figure 3D:
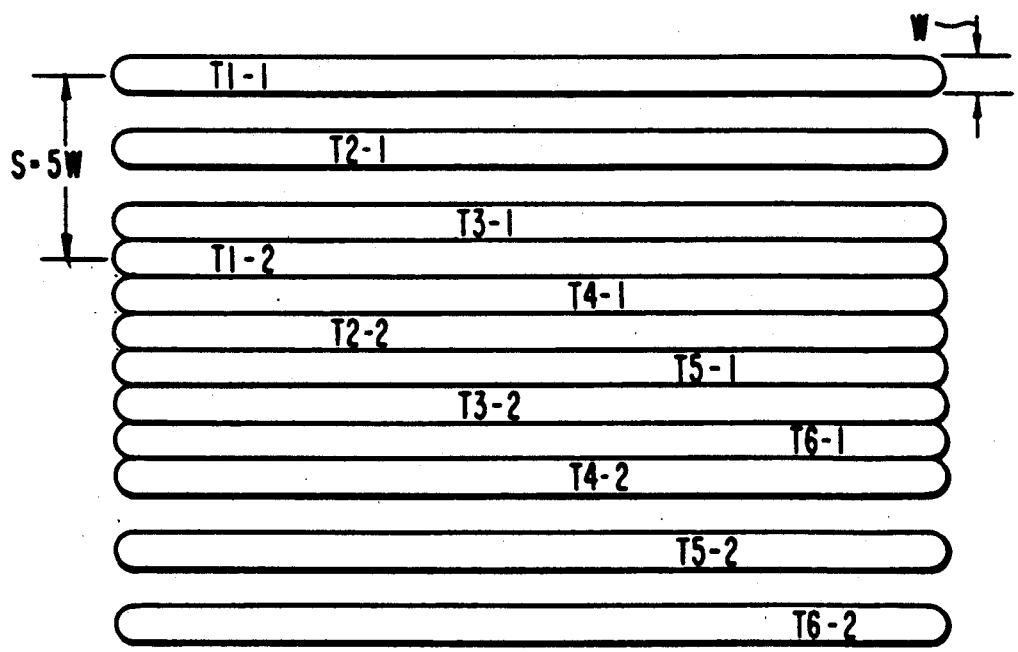

FIG. 3C and 3D illustrate two types of interlace employing only two beams. In both cases the vehicle advances a distance of 2W between pings. In FIG. 3C the beam separation is 3W and in FIG. 3D, the separation is 5W. From Table I it is evident that with two beams (B=2) beam separations of 2W, 4W, and 5W are not practical.

Figure 3E:
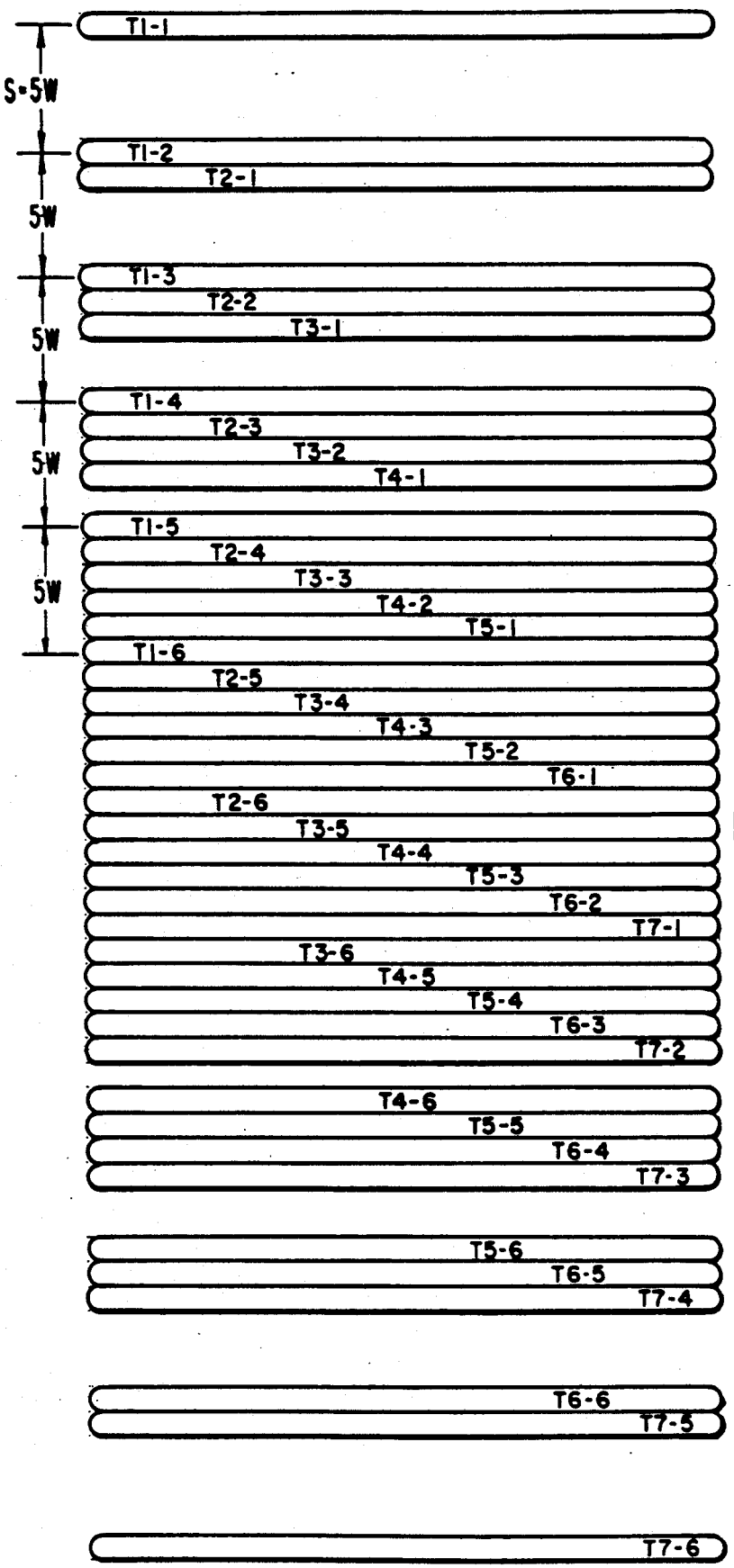

FIG. 3E illustrates a system with six beams (B=6) and with 5W separation (S=5W). Since B and (S/W) contain no common prime factors, such a system is feasible. Note that the vehicle travels 6W between pings. Although there are four gaps in bottom coverage at the beginning and at the end of the run, this lost area is trivial when the run contains thousands of pings.

Figure 4A:
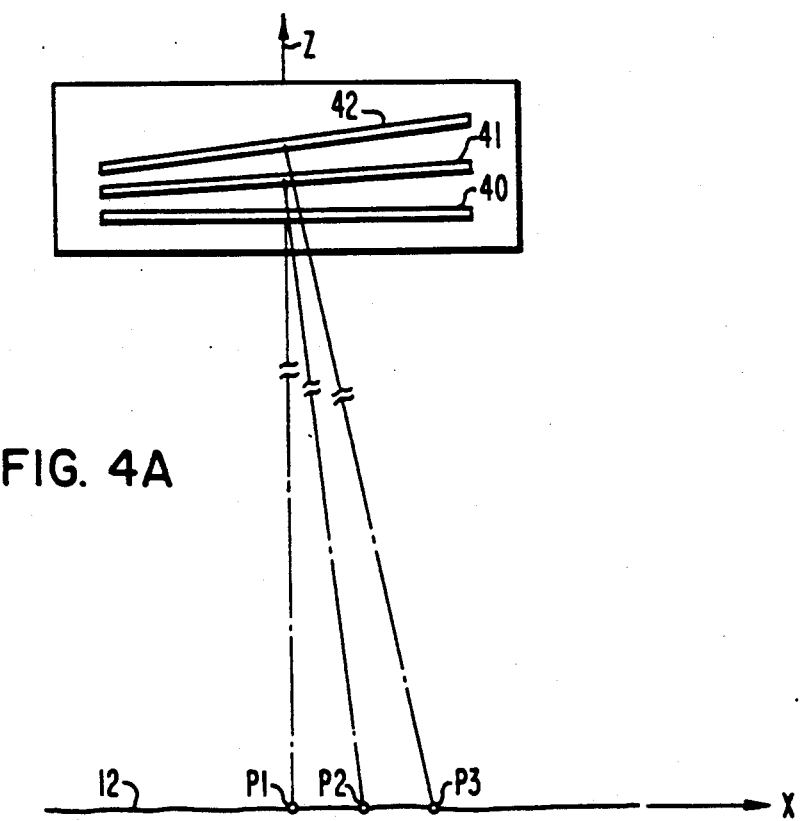
FIGS. 4A and 4B illustrate the orientation of transducers which may be utilized in the present invention.

Side looking sonar transducers are generally made up of a plurality of active transducer elements arranged end to end along a line with the length of the transducer being many hundreds or even thousands of λ, where λ is the operating wavelength in water. For insonifying the three separated strips or receiving acoustic returns from the strips, a set of three elongated transducers such as illustrated in FIG. 4A may be utilized. The three transducers 40, 41 and 42 are illustrated in the vertical plane above the sea bottom 12 and oriented such that the perpendiculars to the centers of each transducer intersect respective separated points P1, P2 and P3, representing the respective centers of the separated insonified strips on the target area.

Figure 4B:
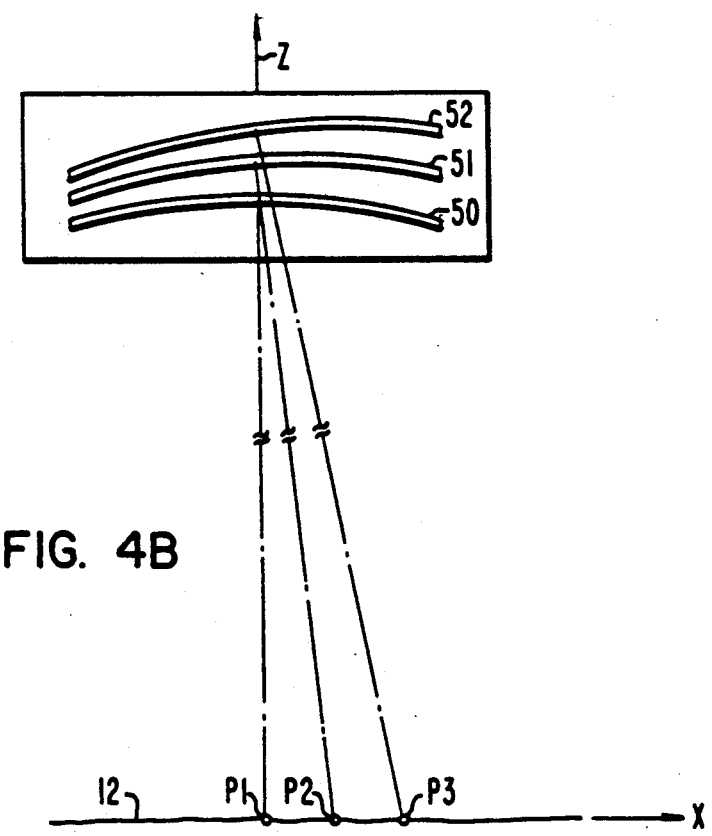
Figure 4C:
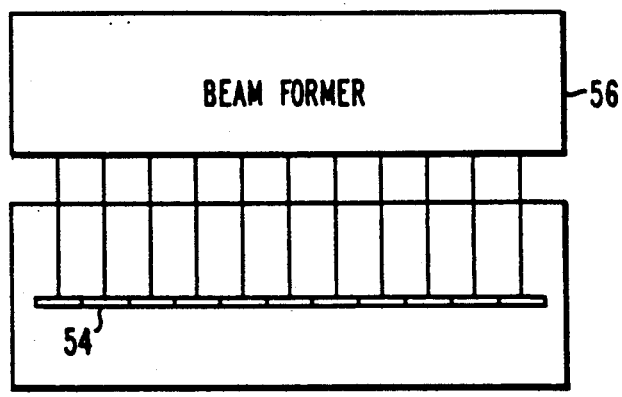
FIG. 4C illustrates a set of leads from a row of transducer elements to a beamformer apparatus for forming a set of separated fan beams.

With the straight line transducers illustrated in FIG. 4A, the sonar system operates in the far field (Fraunhofer region). For operation in the near field (Fresnel region) for extremely high resolution imaging, the active elements are arranged along an arc of a circle as depicted by transducers 50, 51 and 52 of FIG. 4B. As was the case with respect to FIG. 4A, the perpendiculars to the centers of transducers 50, 51 and 52 are directed toward points P1, P2 and P3 on the target area. It is to be noted that these figures are not to scale. As an alternative, and as depicted in FIG. 4C, a plurality of separate strips may be insonified or the acoustic energy from the separate, insonified strips may be processed using a single transducer 54 wherein the output signals from the individual transducer elements thereof are provided to multiple beam former apparatus 56 for simulating a plurality of such transducers, as in FIGS. 4A and 4B.

Figure 5:
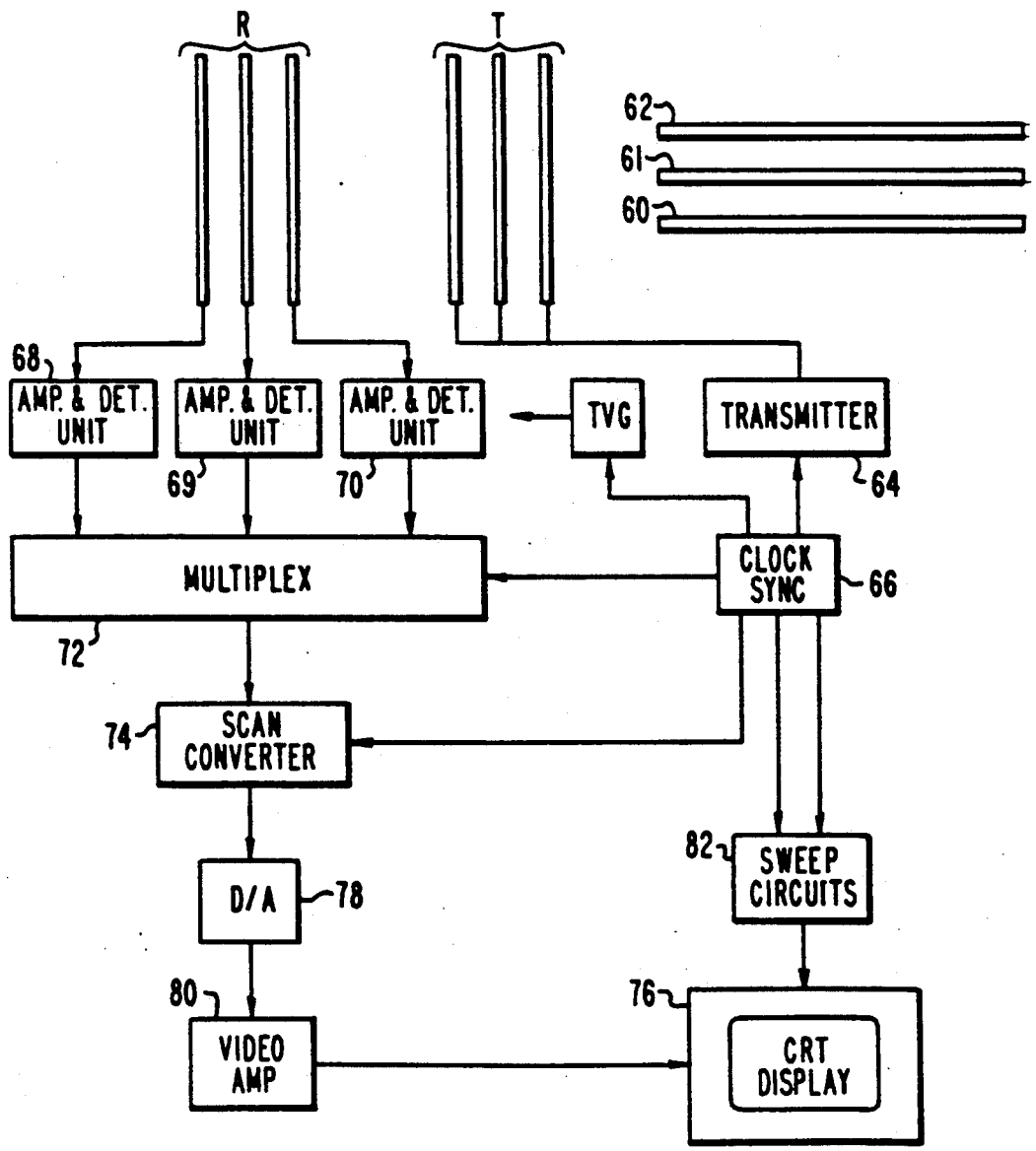
FIG. 5 is a block diagram illustrating one embodiment of the present invention.

In FIG. 5 a plurality of transmitter transducers T are operable to insonify three separated strips 60, 61 and 62 on the target area. A set of receiving transducers R is positioned to intercept the acoustic returns from the insonified strips during course of travel over the target area. The acoustic pulses for insonifying the respective strips are generated by the set of transducers T in response to a signal from transmitter 64 under control of the clock and sync circuit 66.

In response to receipt of the acoustic returns, the receiver transducers will provide respective output signals which are amplified and detected in units 68, 69 and 70, the output signals of which are scanned by multiplexer 72 and provided to a scan converter 74 for storage and eventual presentation on a display. The processed acoustic signals are stored in the scan converter, in digital form, at a first rate and are read out therefrom at a rate compatible with the display 76 which may be a cathode ray tube (CRT). In order to convert the stored digital signals back into analog form, there is provided a digital-to-analog converter 78, the output signals of which are provided to video amplifier 80 for presentation to the display 76 which receives appropriate sweep signals from sweep circuits 82 under control of the clock and sync unit 66. A typical scan converter and display may be operated such that the displayed information is in a moving window format wherein newly acquired information is presented at the top of the CRT whereas older information rolls off the bottom. Although not illustrated, all of the signals from a typical run may be stored on magnetic tape or film for additional future presentation.

Figure 6A:
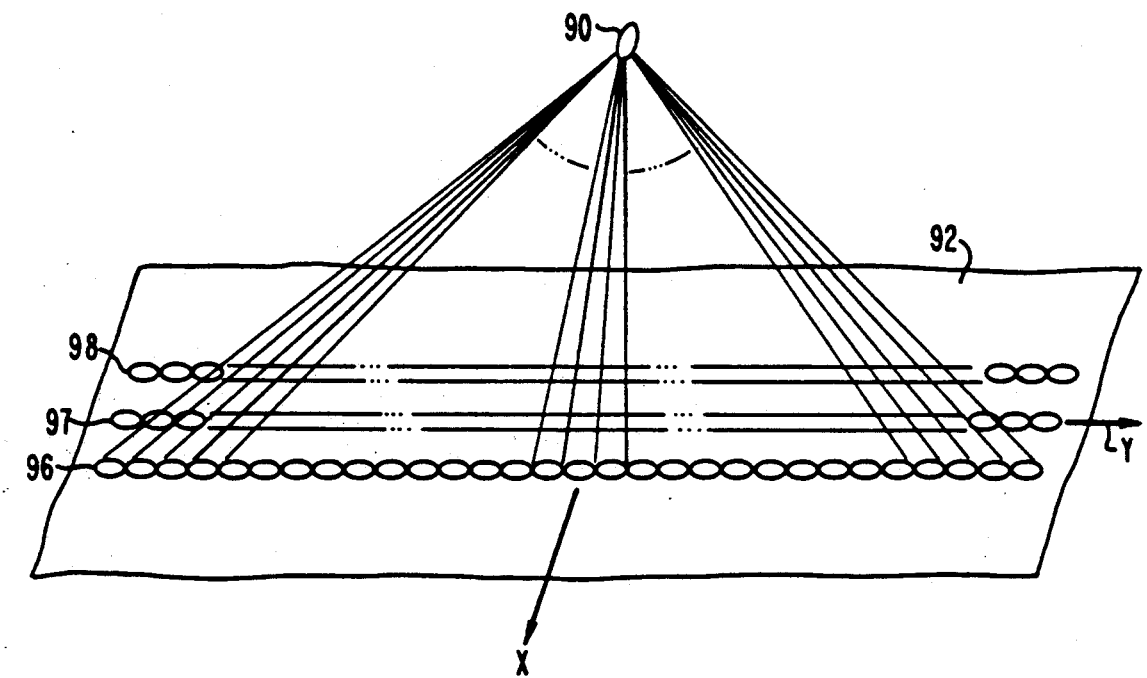
FIG. 6A illustrates rows of pencil beams separated from each other so as to achieve line interlace.

The principles of the present invention are also applicable to other types of sonar systems. For example, when elevational information is desired for imaging or contour mapping, one type of sonar which may be used generates a plurality of narrow pencil beams to insonify a narrow strip below and to either side of the carrier vessel. In FIG. 6A, in accordance with the present invention, a carrier vehicle 90 carrying one or more multiple pencil beam generating sonars is operable over a target area 92 to insonify three separated strips 96, 97 and 98 on a single acoustic transmission. After the first transmission the apparatus will have traveled a distance such that the next projection insonifies a strip between two of the previously insonified strips as was the case with respect to the side looking sonar embodiment except that elevational information may now be determined and displayed such as by varying shades on a black and white CRT or by varying colors on a color CRT.

Figure 6B:
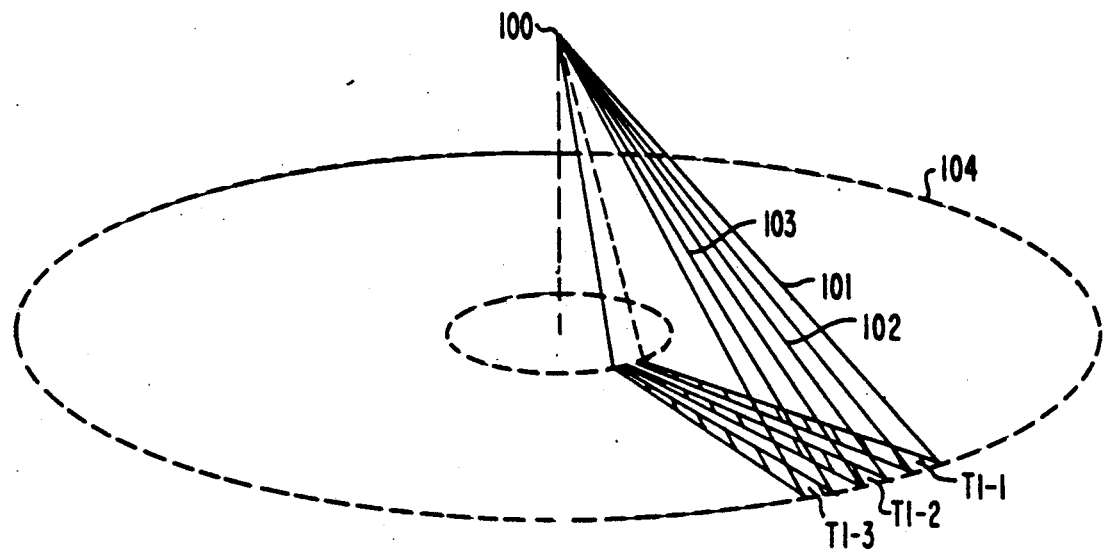
FIG. 6B and 6C illustrate radial fan beams separated from each other so as to achieve beam interlace.
Figure 6C:
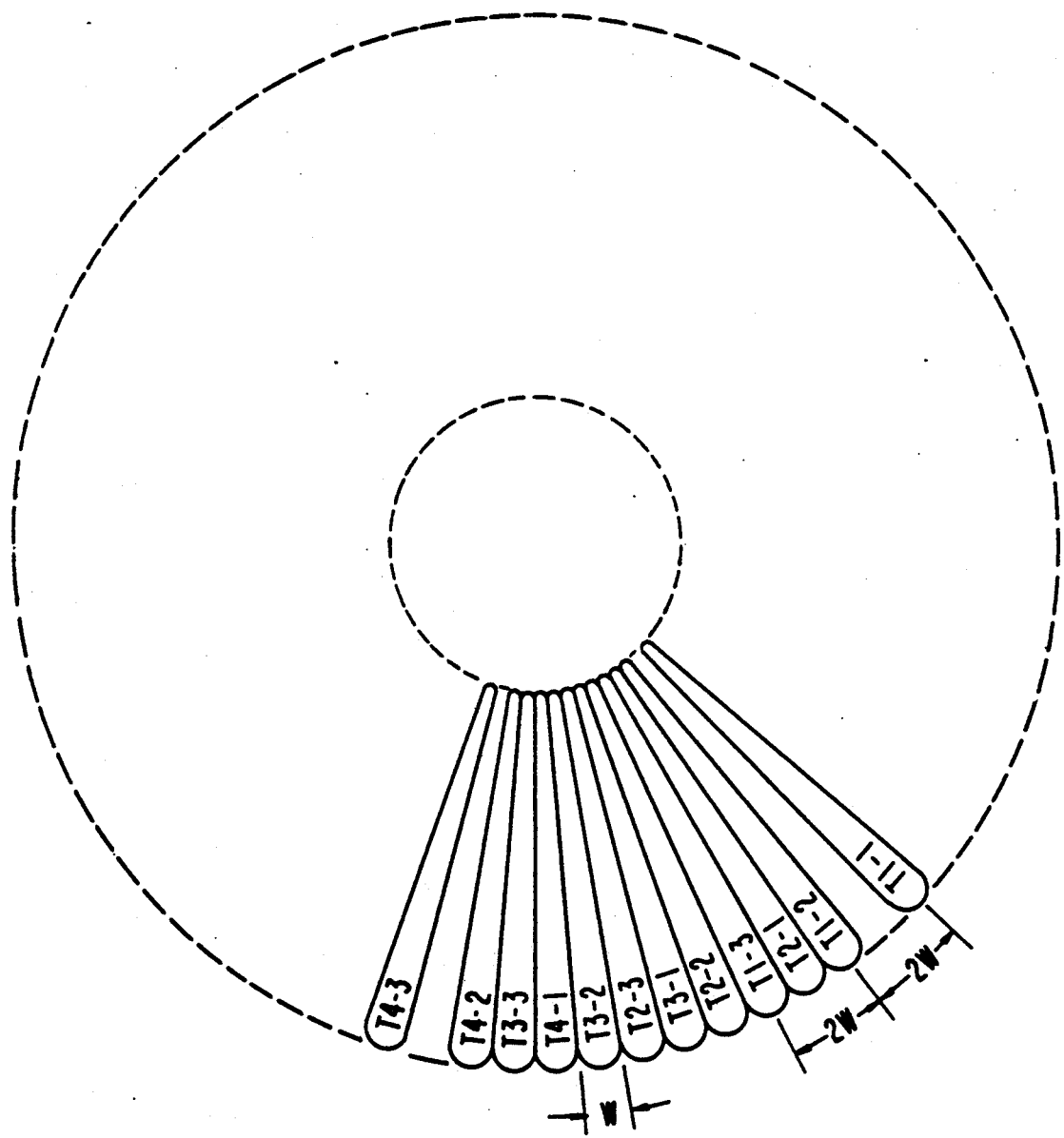

The proposed interlaced method can also be applied to imaging sonars that search an area by rotating a set of fan beams as illustrated in FIGS. 6B and 6C. FIG. 6B shows one set of three beams which would be simultaneously produced to sonify three radial strips on the bottom. The beams may cover a 360° area by constantly rotating, or a sector can be imaged by oscillating the beams over a pie shaped region that covers an angle less than 360°. A vehicle located at 100 produces three beams 101, 102, and 103 which sonify the regions T1-1, T1-2, and T1-3. A set of three receiving beams are positioned to receive reflected sonar energy from these three areas. If a stepping motor is used for rotation, the same transducers can be used for transmission and reception. If, the beams rotate at a constant rate, a separate set of transducers must be used for transmission and reception and must be oriented in such a way as to compensate for the travel time between transmission and reception.

In one revolution of the array, the area 104 will be imaged. FIG. 6C shows a plan view of the bottom target area and the areas associated with three successive insonifications. The angular width of each beam is W. The areas insonified by the first transmission are labeled T1, the areas insonified by the second ping are labeled T2, the areas insonified by the third ping are labeled T3 etc. Table I can be used to determined what combinations of B and (S/W) are practical.

Figure 7A:
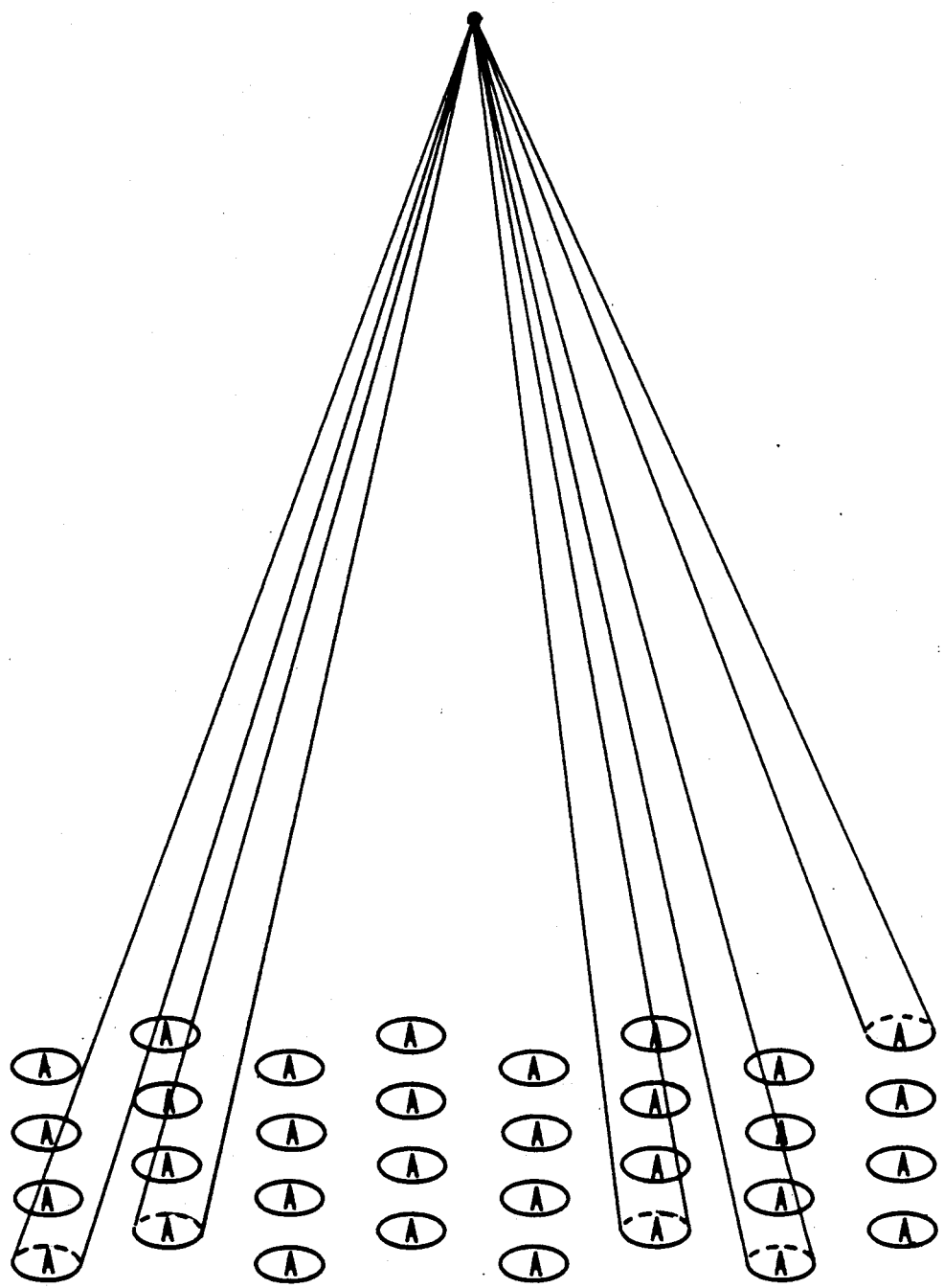
FIG. 7A illustrates a group of uniformly spaced pencil shaped beams.
Figure 7B:
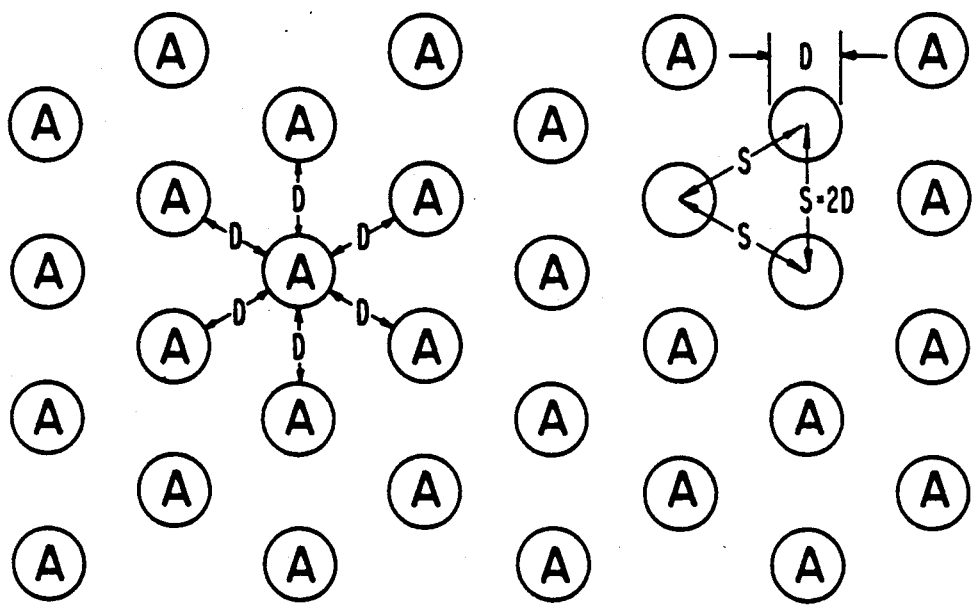
FIG. 7B, 7C and 7D illustrate the nature of interlace that can be achieved with the beams shown in FIG. 7A.
Figure 7C:
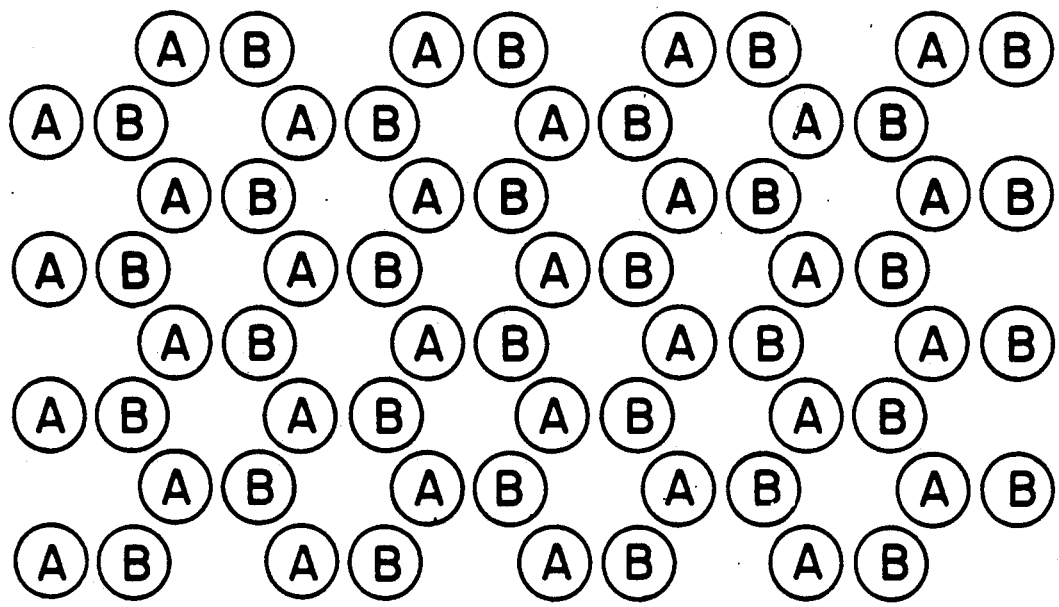
Figure 7D:
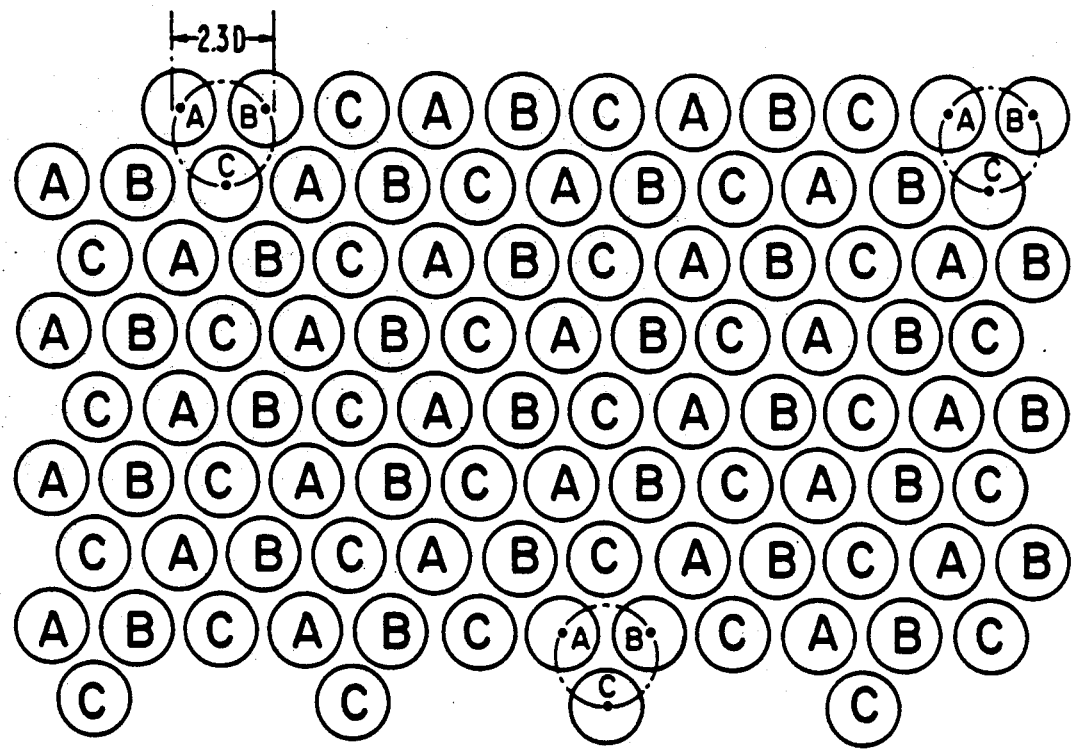

It is also possible in accordance with the present invention to interlace pencil beams in two directions. For example, FIG. 7A illustrates a view of a target area insonified by a plurality of pencil beams. The areas on the sea bottom that are insonified on a first ping are designated by letter A. FIG. 7B is a plan view of these same areas showing their size and location. Each round area is separated from the six surrounding areas by a distance D, where D is the diameter of each area. The distance S between the centers of adjacent areas is equal to 2D. On the second ping the areas marked B in FIG. 7C are insonified. Note that the beam geometry is not changed but is simply shifted a distance D to the right. On the third ping the areas marked C in FIG. 7D are insonified. Note that after three transmissions the entire area has been searched. On the next three pings the areas A, B and C will again be searched. The beamforming apparatus may be mechanically or electronically caused to tip or scan in the indicated manner. The dotted lines in FIG. 7D show that a small conical motion, mutation of the array will cause all of the beams to trace a small circular path having a diameter of 2.3D.

Figure 8A:
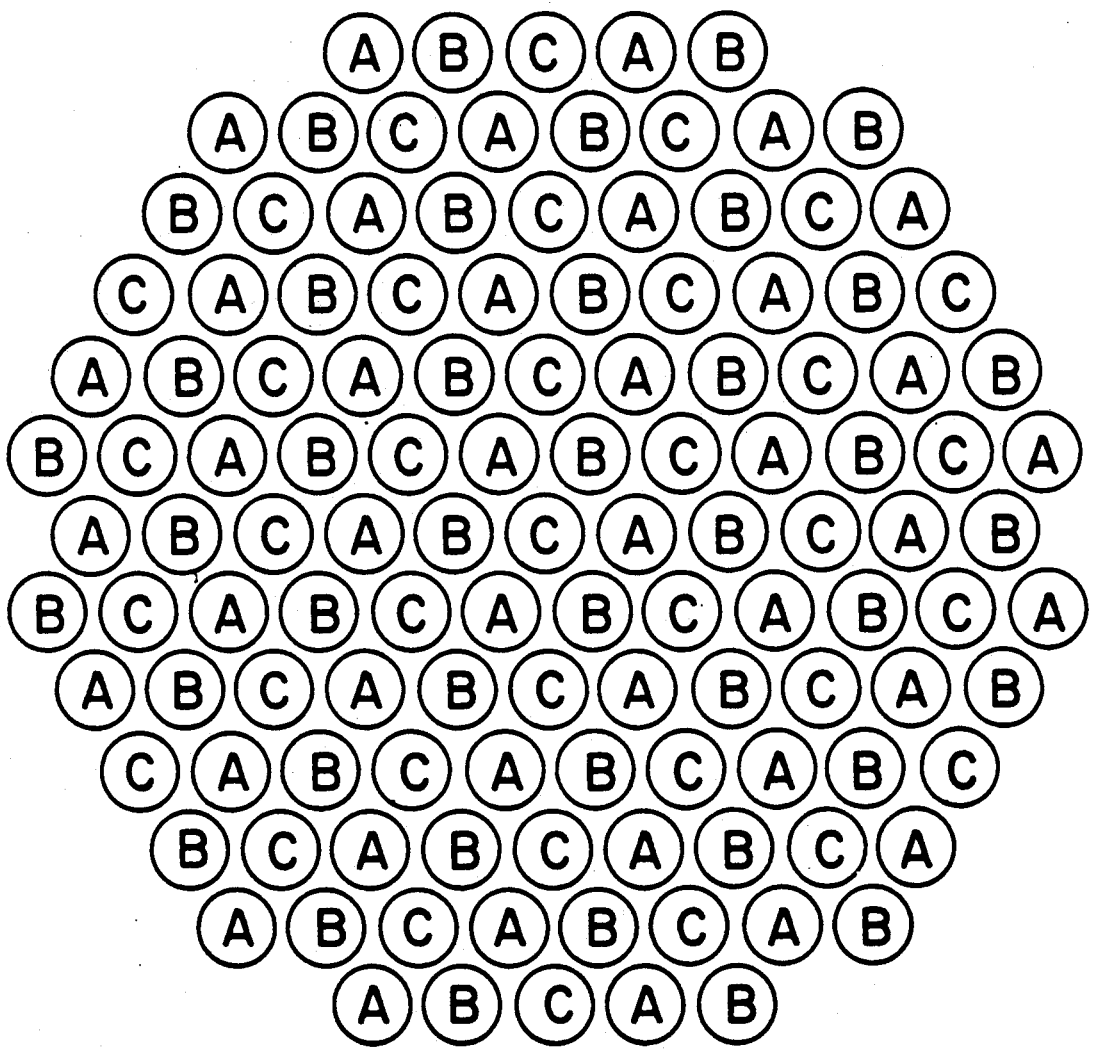
FIG. 8A illustrates an array of transducer elements that can be used with a spherical acoustic lens to produce an interlaced set of pencil beams.
Figure 8B:
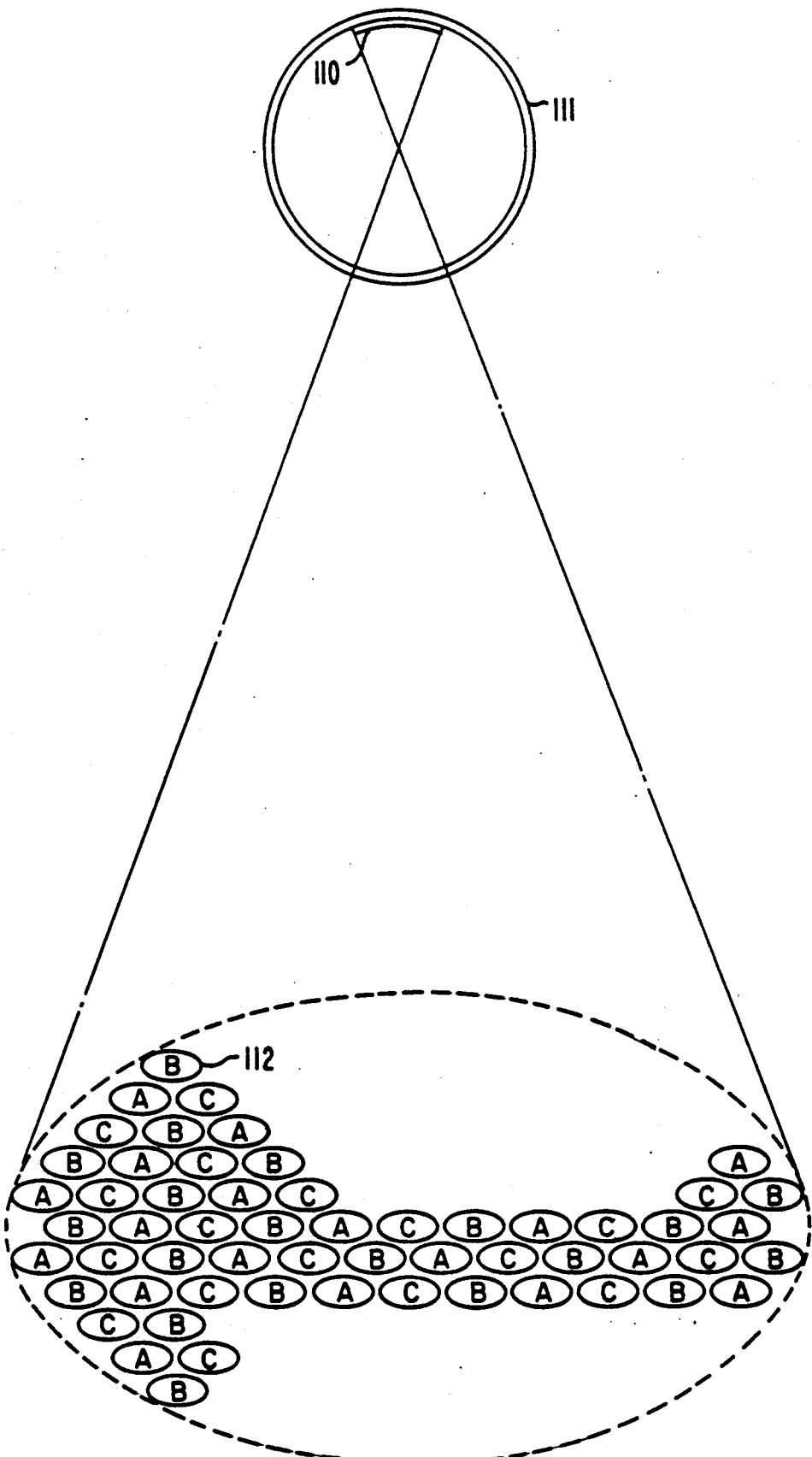
FIG. 8B illustrates a spherical lens and three sets of interlaced pencil beams.

A second method of generating the proposed triple interlace is to use an array of transducer elements arranged as illustrated in FIG. 8A. These are located in the inside top surface 110 of a liquid filled spherical acoustic lens 111 as shown in FIG. 8B. Each of these elements will form a pencil beam and the resulting beam pattern on the sea floor is indicated by numeral 112. The circles of FIG. 8B represent the individual regions insonified and illustrate a triple interlace scheme. All of the circles designated with the letter "A" are insonified on a first transmission, those with the letter "B" on a second transmission, and those with the letter "C" on a third transmission. Each transmission produces an insonified region which falls adjacent to three regions of the previous insonification as in FIGS. 7C and 7D.

Figure 9:
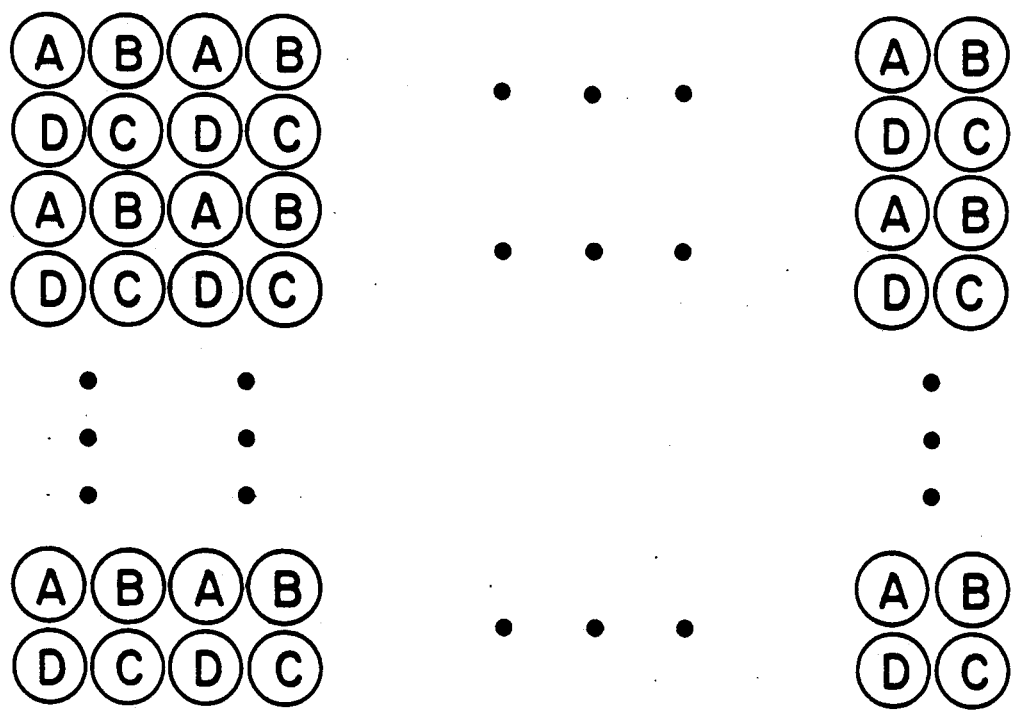
FIG. 9 illustrates a two dimensional pencil beam interlace pattern with an interlace ratio of four.

FIG. 9 is another two-dimensional pencil beam insonification arrangement which utilizes a quadruple interlace. The lettered circles represent the insonification regions from first (A), second (B), third (C) and fourth (D) transmissions. The arrangements of FIGS. 7, 8 and 9 can be utilized on a moving carrier for imaging many regions, or on a stationary platform for obtaining a "snapshot" image, and will provide respective corresponding displays which are not degraded by information from one pencil beam overlapping into another pencil beam.

I claim:

1. Sonar apparatus for use over a target area, comprising:
   A) transmitter means including transmitter transducer means operative to repetitively transmit acoustic pulses toward said target area and operable, on a first acoustic transmission, to insonify a plurality of similar but separated regions of said target area;
   B) receiver means including receiver transducer means operable to receive the acoustic returns from said separated regions;
   C) means for processing and storing said returns;
   D) said transmitter means being operable, on each subsequent acoustic transmission, to again insonify a plurality of similar but separated regions, at least one of which regions lies in the space between two regions insonified on a previous transmission; and
   E) means for utilizing said processed and stored returns.

2. Apparatus according to claim 1 wherein:
A) said transducer means moves a predetermined distance between acoustic transmissions.

3. Apparatus according to claim 2 wherein:
A) said sonar apparatus is a side looking sonar and said processed and stored returns are indicative of acoustic returns from narrow elongated parallel strips generally perpendicular to the direction of travel of said transducer means.

4. Apparatus according to claim 3 wherein:
A) the maximum width of an elongated strip is W, and the minimum width of the space between strips of one acoustic transmission is W.

5. Apparatus according to claim 4 wherein:
A) said transducer means travels a distance of nW between transmissions, where n is a whole number greater than 1.

6. Apparatus according to claim 2 wherein
A) said sonar apparatus is of the type which forms a plurality of generally downwardly directed pencil beams to insonify generally circular regions.

7. Apparatus according to claim 6 wherein:
A) at least a first, second and third plurality of pencil beams are formed for each acoustic transmission;
B) each said plurality insonifying a corresponding plurality of circular regions, each touching an adjacent region to form an elongated strip perpendicular to the direction of travel of said transducer means; and
C) said elongated strips being separated from one another in the direction of travel of said transducer means.

8. Apparatus according to claim 1 wherein:
A) said sonar apparatus is of the type which forms a plurality of generally downwardly directed pencil beams to insonify generally circular regions;
B) a first plurality of pencil beams are formed for each acoustic transmission; and
C) each said pencil beam of said first plurality insonifying a corresponding plurality of circular regions separated from one another by at least the diameter of a said circular region.

9. Apparatus according to claim 8 wherein:
A) each of said circular regions is at the apex of an equilateral triangle formed by two other regions which are insonified at the same time.

10. Apparatus according to claim 3 wherein:
A) the width of each said strip is W;
B) the number of strips formed on each said transmission is B;
C) the distance between the centerlines of adjacent ones of said strips is S; and D) B, S and W being selected such that (S/W) is a whole number and B and (S/W) contain no common prime factors.

11. Apparatus according to claim 1 wherein
A) said apparatus is rotatable relative to said target area to form separated radial insonified strips on each said transmission.

12. Apparatus according to claim 11 wherein:
A) the angular width of each said radial strip is W;
B) the number of said radial strips formed on each said transmission is B;
C) the angular space between the centerlines of adjacent ones of said radial strips is S;
D) B, S and W being selected such that (S/W) is a whole number and B and (S/W) contain no common prime factor.

13. An interlace sonar system comprising:
A) acoustic transmitter means for operation over a target area and operable to project acoustic energy toward said target area in repetitive acoustic transmissions;
B) said transmitter means being constructed and arranged to insonify, on one acoustic transmission, a set of separated regions of said target area;
C) said transmitter means being operable on subsequent transmissions to insonify similar sets of regions in a manner that said separated regions resulting from one transmission do not overlap insonified regions from any previous transmission.

* * * * *